United States Patent
Agerstam et al.

(10) Patent No.: US 11,483,418 B2
(45) Date of Patent: Oct. 25, 2022

(54) PLUGIN MANAGEMENT FOR INTERNET OF THINGS (IOT) NETWORK OPTIMIZATION

(71) Applicant: Intel Corporation, Santa Clara, CA (US)

(72) Inventors: Mats Gustav Agerstam, Portland, OR (US); Vijay Sarathi Kesavan, Portland, OR (US)

(73) Assignee: Intel Corporation, Santa Clara, CA (US)

(*) Notice: Subject to any disclaimer, the term of this patent is extended or adjusted under 35 U.S.C. 154(b) by 332 days.

(21) Appl. No.: 16/110,011

(22) Filed: Aug. 23, 2018

(65) Prior Publication Data
US 2019/0045033 A1    Feb. 7, 2019

Related U.S. Application Data

(60) Provisional application No. 62/595,324, filed on Dec. 6, 2017.

(51) Int. Cl.
| | |
|---|---|
| *H04L 9/00* | (2022.01) |
| *H04L 69/08* | (2022.01) |
| *H04L 67/10* | (2022.01) |
| *H04L 9/40* | (2022.01) |
| *H04L 67/12* | (2022.01) |
| *H04L 67/04* | (2022.01) |
| *H04W 12/08* | (2021.01) |

(Continued)

(52) U.S. Cl.
CPC .............. *H04L 69/08* (2013.01); *H04L 63/10* (2013.01); *H04L 63/101* (2013.01); *H04L 63/20* (2013.01); *H04L 67/04* (2013.01); *H04L 67/10* (2013.01); *H04L 67/12* (2013.01); *H04L 67/51* (2022.05); *H04L 67/565* (2022.05); *H04W 4/70* (2018.02); *H04W 12/08* (2013.01)

(58) Field of Classification Search
CPC ........................................................ H04L 69/08
USPC ............................................................. 726/1
See application file for complete search history.

(56) References Cited

U.S. PATENT DOCUMENTS

| 9,210,534 B1 | 12/2015 | Matthieu et al. |
| 2016/0241641 A1 | 8/2016 | Mazor |

(Continued)

FOREIGN PATENT DOCUMENTS

| DE | 112018005810 T5 | 9/2020 |
| WO | WO-2017201639 A1 | 11/2017 |
| WO | WO-2019112734 A1 | 6/2019 |

OTHER PUBLICATIONS

OCF Core Specification Version 1.0.0 pp. 1-277, Jun. 2017 (Year: 2017).*

(Continued)

*Primary Examiner* — Christopher J Brown
(74) *Attorney, Agent, or Firm* — Schwegman Lundberg & Woessner, P.A.

(57) ABSTRACT

Various systems and methods for network optimization or bandwidth conservation may use plugin migration or mirroring to access a plugin utilizing a first network protocol in the cloud. A cloud-based plugin allows for routing optimization to leverage resource directory from the first network protocol to provide discovery or access to the plugin. The plugin may be used when a device operating the first network protocol communicates with a device operating a second, different, network protocol.

22 Claims, 9 Drawing Sheets

(51) Int. Cl.
  *H04W 4/70*   (2018.01)
  *H04L 67/51*  (2022.01)
  *H04L 67/565* (2022.01)

(56) References Cited

U.S. PATENT DOCUMENTS

| | | |
|---|---|---|
| 2017/0000582 A1 | 1/2017 | Zimmerman et al. |
| 2017/0187835 A1 | 6/2017 | Lim et al. |
| 2017/0279894 A1* | 9/2017 | Chen ................... H04L 69/18 |
| 2018/0084085 A1* | 3/2018 | Shanmugasundaram .................. H04L 12/2818 |
| 2018/0102934 A1* | 4/2018 | Ly ...................... H04L 41/02 |
| 2018/0191848 A1* | 7/2018 | Bhattacharya ...... H04L 63/0876 |
| 2018/0227368 A1* | 8/2018 | Zhao ................... H04L 67/12 |
| 2019/0089747 A1* | 3/2019 | Wang .................. H04L 9/0841 |
| 2019/0098089 A1* | 3/2019 | Shim ................... H04L 67/12 |
| 2019/0158355 A1* | 5/2019 | Ramisetty ........... H04L 63/0853 |

OTHER PUBLICATIONS

"International Application Serial No. PCT/US2018/059416, International Search Report dated Feb. 13, 2019", 3 pgs.
"International Application Serial No. PCT/US2018/059416, Written Opinion dated Feb. 13, 2019", 7 pgs.
"International Application Serial No. PCT/US2018/059416, International Preliminary Report on Patentability dated Jun. 18, 2020", 9 pgs.

* cited by examiner

PLUGIN MANAGEMENT FOR INTERNET OF THINGS (IOT) NETWORK OPTIMIZATION

CLAIM OF PRIORITY

This application claims the benefit of priority to U.S. Provisional Applications Nos. 62/595,324, filed Dec. 6, 2017, titled "Plugin Management For IOT Network Optimization", which is hereby incorporated herein by reference in its entirety.

TECHNICAL FIELD

Embodiments described herein generally relate to data communications and interconnected device networks, and in particular, to techniques for establishing connections and implementing functionality among internet of things (IoT) devices and device networks.

BACKGROUND

IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, and related apparatuses are disclosed for the processing of security contexts in an IoT device interconnection setting through the use of a cloud-hosted plugin.

OCF provides a standard for IoT communication for a variety of use cases such as in the connected home. Some instantiations of OCF, such as Iotivity, provide various extensions to the OCF specifications that offers interoperability to other non-OCF eco-systems. This is done through means of a plugin manager that enables non-OCF devices to appear on a domain as OCF devices providing a homogenous device view and cross-ecosystem interoperability. Open solutions today often host their services on the cloud and as a result, security and access flows have to go through a cloud hosted service. However, use of a plugin solution introduces a set of additional traffic flows and adds a significant amount of latency that can prevent the service to provide the targeted level of quality-of-service (QoS) to the end user. The techniques discussed herein include a solution to this and other technical problems via plugin and authorization migration to the cloud.

Today's implementations of OCF extensions do not currently offer a solution to this problem. Some techniques that leverage the protocol manager for OCF do so by hosting all of the plugins on a local gateway device hence incurring the latency through all of the unnecessary network traversals between the private and public domain.

The solutions described herein, which may use a routing optimizer, leverage a resource directory (e.g., an OCF resource directory) to provide discovery and access to a proper plugin instance (e.g., private domain vs. public domain), and also detail mirroring or migrating a plugin instance to the public domain persisting authorization bindings the user has established. This solution presents an automatic mechanism for third-party non-OCF plugins or non-native plugins to automatically be mirrored or migrated to a cloud hosted environment in a vendor agnostic fashion, preserving security associations and providing a more network optimal access path to the service via means of reducing overall network traffic, hops, and round-trip time.

Figure 1:
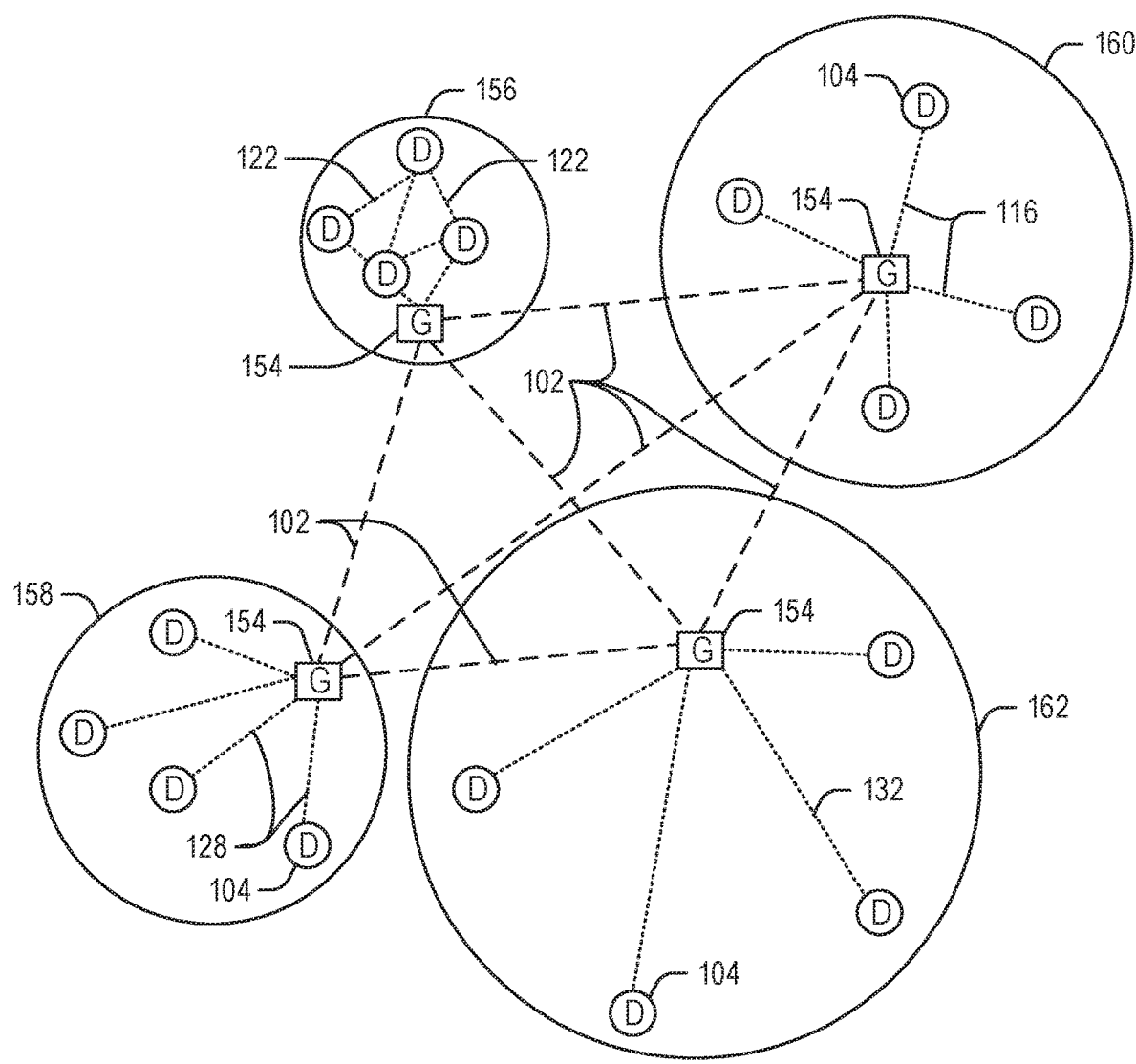
FIG. 1 illustrates a domain topology for respective internet-of-things (IoT) networks coupled through links to respective gateways, according to an example.

FIG. 1 illustrates an example domain topology for respective internet-of-things (IoT) networks coupled through links to respective gateways. The IoT supports deployments in which a large number of computing devices are interconnected to each other (and to the Internet) to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
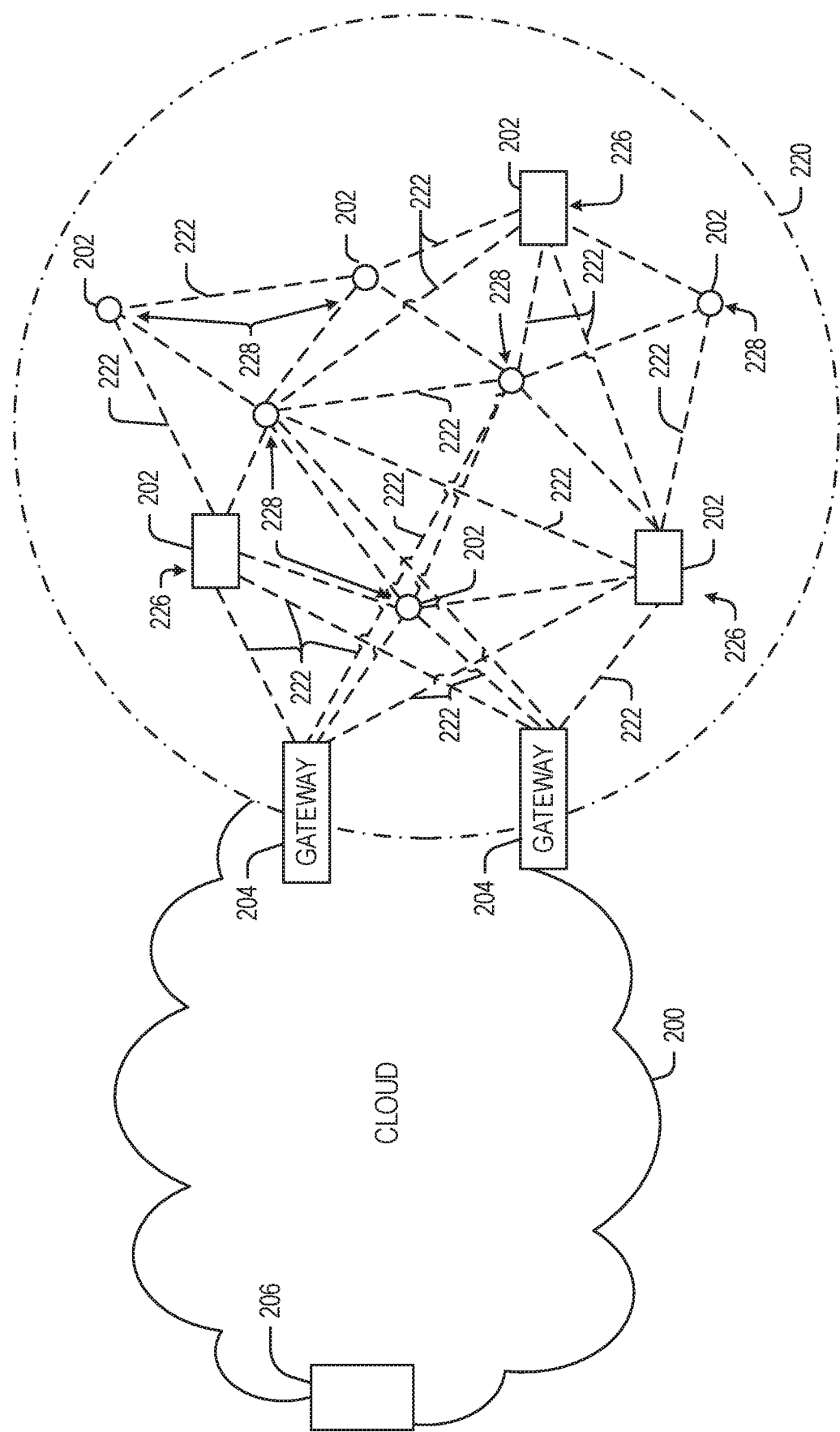
FIG. 2 illustrates a cloud computing network in communication with a mesh network of IoT devices operating as a fog platform in a networked scenario, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on QoS terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of IoT networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and QoS based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 7 and 8.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 2 below.

FIG. 2 illustrates a cloud computing network in communication with a mesh network of IoT devices (devices 202) operating as a fog platform in a networked scenario.

The mesh network of IoT devices may be termed a fog network 220, established from a network of devices operating at the edge of the cloud 200. To simplify the diagram, not every IoT device 202 is labeled.

The fog network 220 may be considered to be a massively interconnected network wherein a number of IoT devices 202 are in communications with each other, for example, by radio links 222. The fog network 220 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 220 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, the OMA Lightweight M2M (LWM2M) protocol, protocols according to a onem2m specification, a OPC Unified Architecture protocol, or a protocol according to an Open Process Automation Forum (OPAF) specification, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog network 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204.

The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog network 220 provided from these IoT devices 202 may be presented to devices in the cloud 200, such as a server 206, as a single device located at the edge of the cloud 200, e.g., a fog network operating as a device or platform. In this example, the alerts coming from the fog platform may be sent without being identified as coming from a specific IoT device 202 within the fog network 220. In this fashion, the fog network 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog platform may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog network 220 selecting the IoT devices 202, such as particular sensors 228, needed to answer the query. The data from these sensors 228 may then be aggregated and analyzed by any combination of the sensors 228, data aggregators 226, or gateways 204, before being sent on by the fog network 220 to the server 206 to answer the query. In this example, IoT devices 202 in the fog network 220 may select the sensors 228 used based on the query, such as adding data from flow sensors or temperature sensors. Further, if some of the IoT devices 202 are not operational, other IoT devices 202 in the fog network 220 may provide analogous data, if available.

Figure 3:
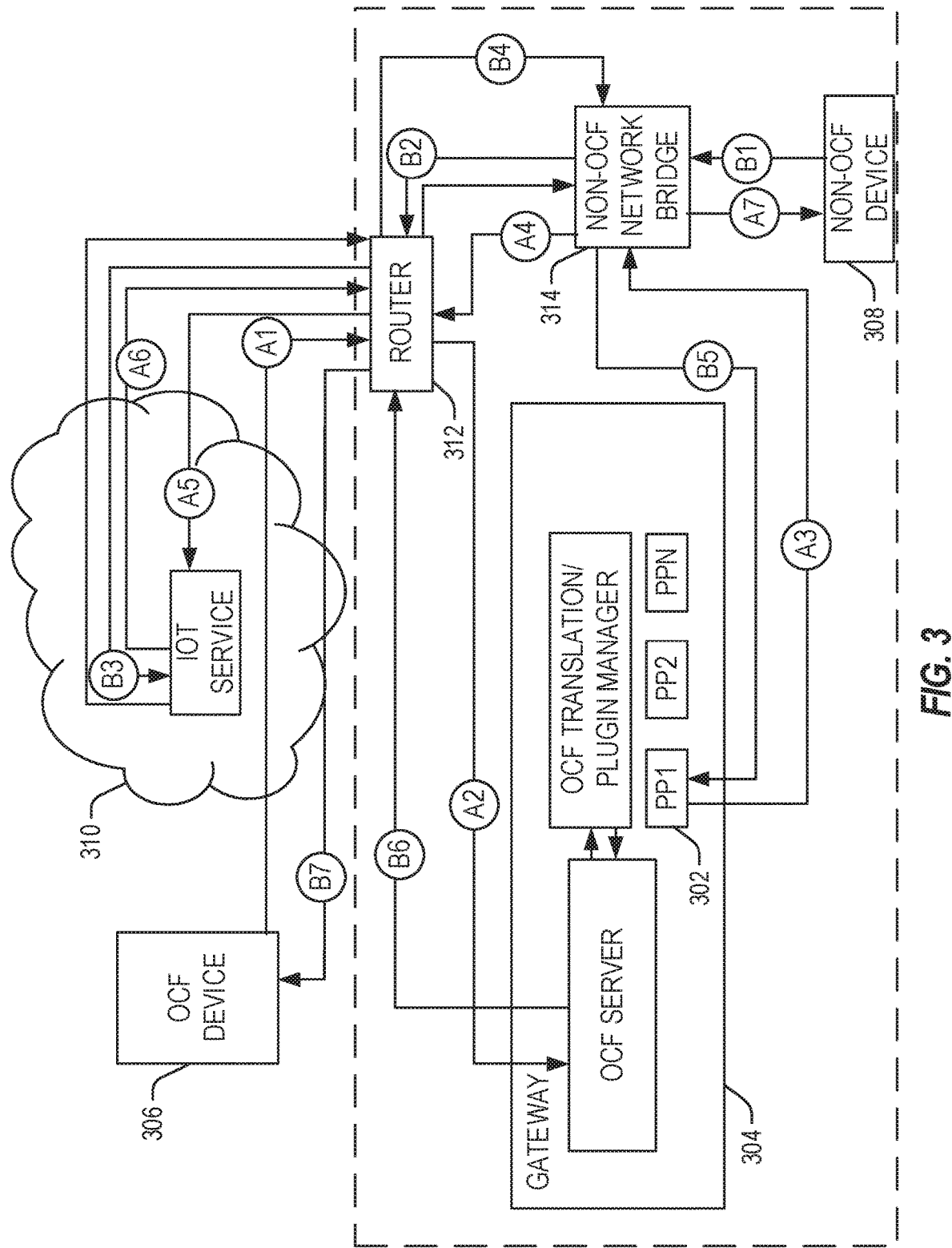
FIG. 3 illustrates a schematic diagram of an OCF system with a plugin on a gateway device, according to an example.

FIG. 3 illustrates a schematic diagram of an OCF system with a plugin 302 on a gateway device 304, according to an example. The plugin 302 may be one of multiple plugins (e.g., PP1, PP2, . . . , PPN) running or operable to run on the gateway device 304. The gateway device 304 may include an OCF translation/plugin manager to select a correct plugin to activate. In an example, the gateway device 304 may be wired to the router 312 or the non-OCF device 308. In another example, the OCF device 306 may be wired to the cloud service 310. Connections between devices or services in FIGS. 3-5 may include wired or wireless connections.

Some current IoTivity techniques use a plugin on a gateway device. In this configuration (FIG. 3), the gateway device 304 (e.g., a smart home device) provides an access function for OCF devices (e.g., OCF device 306) as well as protocol plugin functionality for a non-OCF ecosystem (e.g., for a non-OCF device 308). The external OCF device 306 attempts to access one of the authorized non-OCF devices 308 (e.g., one that has already been authorized through mechanism defined, supplied and mandated by a third party verifier (TPV), such as OAuth 2.0 or similar). The plugin 302 "PP1" acts on one hand as the client of the non-OCF device 308, and on the other as an OCF server on the gateway device 304.

Because the OCF device 306 and the non-OCF device 308 may use different communication channels, protocols, or file types, the plugin 302 on the gateway device 304 translates between the two devices 306 and 308.

In an example, the external OCF device 306 may obtain access to the non-OCF device 308 on the local home domain using a technique shown in FIG. 3. The OCF device 306 may be a handheld device, such as a smart phone or other mobile device (e.g., any device capable of using the OCF communication protocol).

Figure 4:
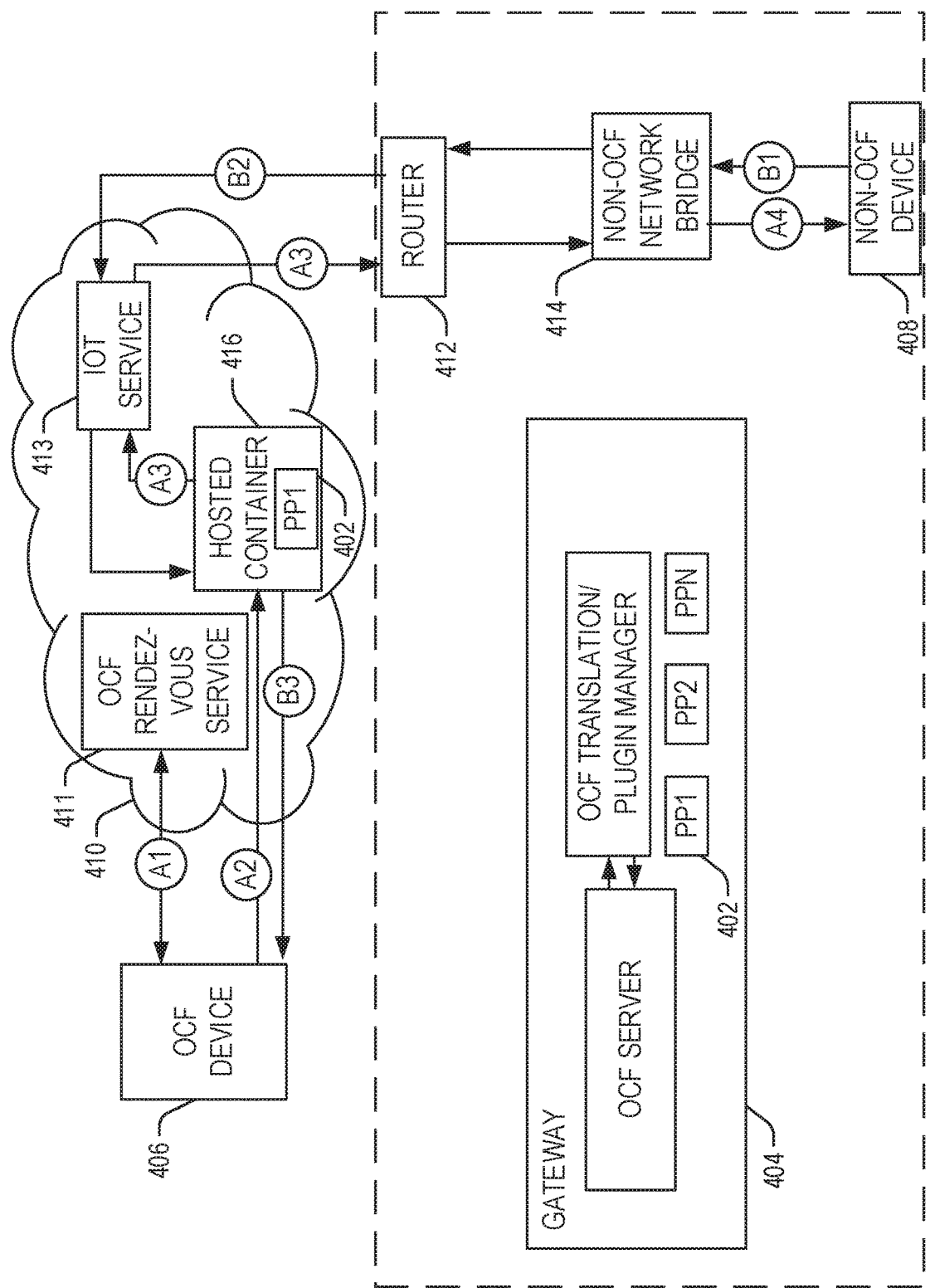
FIG. 4 illustrates a schematic diagram of an OCF system with a plugin in the cloud, according to an example.
Figure 5:
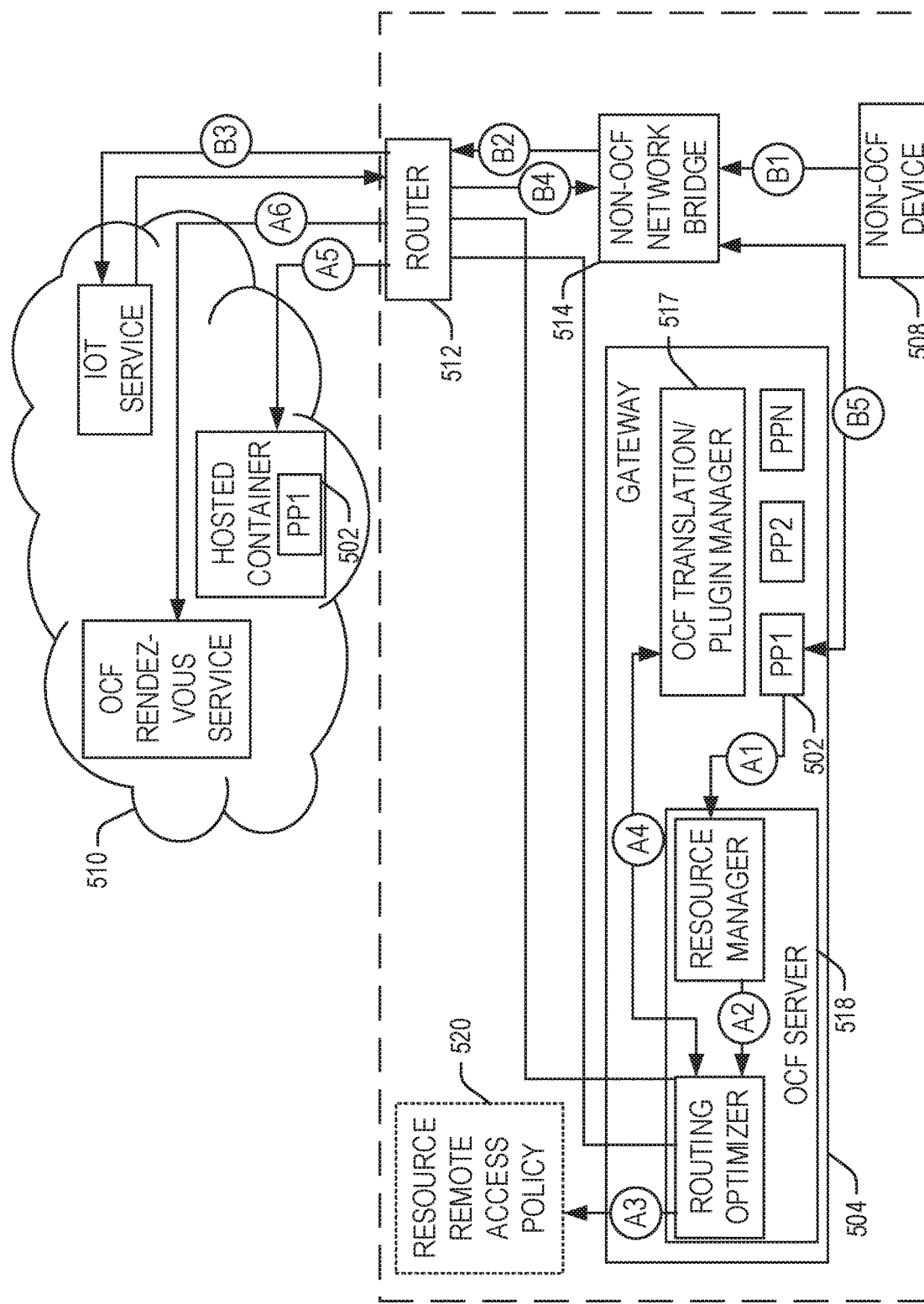
FIG. 5 illustrates a schematic diagram of an OCF system with a router optimizer service, according to an example.

FIGS. 3-5 show a home domain or local network including a gateway and a non-OCF device. The home domain or local network may include a locally routed communication network (e.g., a Wi-Fi network). Thus the home domain or local network is discussed herein separately from a wide area network (e.g., the cloud) which may include the internet. The home domain or local network may be separated from the internet or a cloud service by a router or other network component. In an example, a cloud service or OCF cloud may include a logical entity authorized to communicate with an OCF device (or other device). The OCF cloud may include a resource directory for exposing resource information published by a device, such as for provisioning a resource, updating a resource, or registering a resource. In an example, a cloud as described herein may include an edge computing device or edge cloud device or service.

For example, a request flow (from OCF device 306 to non-OCF device 308, which may be an IoT device) is described according to operations labeled A in FIG. 3. While the operations are shown in FIGS. 3-5 as ordered operations, communications may sometimes be performed in different orders or omitted without deviating from the scope of the systems and methods described herein.

In the request flow, the OCF device 306 reaches out to a router 312 (or rendezvous service) to discover the reflexive endpoint of the home domain (e.g., the non-OCF device 308). In another example, a DDNS service or similar may be used. In any of these examples, the initial lookup of the address of the home domain may be necessary.

The OCF device 306 connects to the OCF server (e.g., via the router 312) on the gateway device 304 through, for example, IPv4 mechanism of port forwarding mapping via network address translation Port Mapping Protocol (NAT-PNP) universal plug and play (UPnP), firewall hole punching or NAT traversal with Session Traversal Utilities for NAT (STUN), Traversal Using Relay around NAT (TURN), Interactive Connectivity Establishment (ICE), etc. (A1). The exact flow of how the external device connects to the home domain may differ from the setup shown in FIG. 3, or may include different routing than that shown in FIG. 3.

The OCF device 306 may discover, introspect, and perform an operation on the available gateway device 304 (A2) to access the non-OCF device 308. The OCF stack discovers the locally running instance of the plugin manager that hosts the OCF plugin server for the non-OCF device 308 denoted plugin 302 "PP1." PP1 in turn uses a connection (e.g., over internet protocol (IP)) to the non-OCF network bridge 314 connected to the device 308 (A3). In an example, a bridge may or may not be required based on the local network communication technologies enabled on the gateway device 304.

The request from the OCF device 306 may be transmitted to a cloud service 310, which may handle the authorization, access control, and control plane (A4, A5). The cloud service 310 may receive the request from the non-OCF network bridge 314, after the bridge receives the request from the plugin 302. The cloud service 310 may be called an IoT service for processing the request.

The cloud service 310 communicates back down to the non-OCF network bridge 314 (e.g., a gateway or hub) with instructions to the non-OCF device 308. The bridge 314 may handle the translation from IPv4/IPv6 to its own network protocol (e.g., 6Lo/IPv6, 802.15.4, Bluetooth Low Energy (BLE), ZigBee, ZWave, . . . ) (A6). The non-OCF device 308 receives the request (A7) and performs the requested operation.

In an example, the return flow (non-OCF device 308 to OCF device 306 is described according to operations labeled "B" in FIG. 3. In an example, the response is sent from the non-OCF device 308, to the cloud service 310 through the home router (B1, B2, B3), going to the bridge 314, the router 312, and then to the cloud service 310, for example. The cloud service 310 returns the response code back down via the router 312, to the OCF server running on the gateway device 304 (B4, B5), via the bridge 314 and router 312. The gateway device 304 forwards the response back out through the router, before being received at the OCF device 306 (B6, B7). The plugin 302 may be used to process the response at the gateway device 304.

The OCF networks described herein include a network "domain" or "context". For example, in an OCF network, an OCF application may access resources and perform RESTful operations within a common application context or domain. In other types of networks (e.g., as referred to herein as an "non-OCF network), an OCF application may not be able to directly access such resources or operations. The techniques discussed herein address this by using a plugin to convert between a non-OCF protocol or network and an OCF framework (e.g., network, domain, context, or application).

FIG. 4 illustrates a schematic diagram of an OCF system with a plugin in the cloud, according to an example.

The OCF system shown in FIG. 4 includes an OCF plugin 402 to be mirrored or migrated (e.g., based on implementation choice) to be externally hosted in a cloud environment 410 or optionally co-located with a rendezvous server 411. The OCF plugin 402 is shown in FIG. 4 as being mirrored, as it exists on the gateway 404 and in the cloud 410. In another example, the OCF plugin 402 may be migrated to the cloud 410 and not appear on the gateway 404 or be disabled or deactivated on the gateway 404.

In an example, the OCF plugin 402 may use a OCF Rendezvous Server 411 to support conditional return of a look-up response of a service or resource to a home domain or the cloud hosted plugin 402, such as based on the reflexive address of the calling device.

The plugin first may be either migrated or mirrored to reside and be hosted in the cloud 410. Hosting may be done by co-locating the plugin 402 with the rendezvous service 411, or the plugin 402 may be hosted elsewhere in the cloud 410.

A user (e.g., of the OCF device 406, or optionally of the non-OCF device 408) may be provided with an option to authorize mirroring or migration of the plugin 402 to an external source (e.g., the cloud 410). For example, when the OCF device 406 is in the home domain, the user may authorize the migration via the OCF device 406. The rendezvous server 411 may look at the source address of the OCF device 406 to make an informed routing decision as to which instance of the plugin 402 is to be managing the request, such as to reduce latency or network traffic. When the request comes from outside the network (e.g., the OCF device 406 is outside the home domain), the request may be routed to the external plugin 402 instance (e.g., hosted by the rendezvous server 411 or other public entity). Further details of this example are described below.

A request flow from the OCF device 406 to a non-OCF device (e.g., an IoT device) may include the following operations. The OCF device 406 may send an indication to the rendezvous service 411, which may eliminate the need to reach down to the reflexive endpoint (e.g., the non-OCF device 408) of the home domain. The OCF device 406, based on information received from the rendezvous service 411, may instead route the request directly to the cloud hosted plugin service 416 (also called a hosted container), which includes the plugin 402.

The plugin service 416 authorizes the request and invokes the IoT cloud service 413 with its own authentication and authorization scheme. The cloud service 413 communicates back down to a non-OCF gateway/hub device/network bridge 414 via a router 412 with instructions to the non-OCF device 408. The bridge 414 handles the translation from IPv4/IPv6 to a local network protocol (e.g., 6Lo/IPv6 802.15.4, BLE, ZigBee, ZWave, etc.).

The IoT device (non-OCF device 408) performs the requested operation after receiving the instructions from the bridge.

A response flow from the non-OCF device 408 to the OCF device 406 is now described.

The response is sent back directly from the non-OCF device 408 via the gateway 414 and optionally the router 412 to the cloud service 410. The response may then be sent to the IoT service 413, to be relayed to the plugin 402 on the cloud 410. The cloud service 411 relays the response back to the cloud hosted plugin 402 which forwards the response to the OCF device 406. In an example, the request/response flows may be performed separately (e.g., the OCF device 406 may send a request without needing or receiving a response or the non-OCF device 408 may send a message, such as a status, update, or notification to the OCF device 406 without receiving a request from the OCF device 406). In another example, the request/response flows may be reversed, where the non-OCF device 408 sends a message first and the OCF device 406 replies.

The description above shows how migrating or mirroring the plugin in the cloud optimizes the round trip latency for the end user (e.g., at the OCF device 406). In an example, the gateway 404 may not be used in the request/response flows described above. In another example, the plugin 402 on the gateway 404 may be updated or modified based on information received in a receive or request flow, such as from the plugin 402 hosted on the cloud 410. Described below in FIG. 5 is a routing optimizer component that facilitates the migration/mirroring process.

FIG. 5 illustrates a schematic diagram of an OCF system with a router optimizer service, according to an example. The OCF system shown in FIG. 5 includes a plugin 502 that may be migrated from or mirrored on a gateway 504. The OCF system of FIG. 5 may be used for onboarding a non-OCF device 508. Onboarding may include registering, authenticating, or mapping resources.

The non-OCF device 508 onboarding process includes the device 508 communicating with its cloud 510 IoT service through, for example, a non-OCF network bridge 514 or a home router 512.

After the device 508 is on-boarded, the plugin 502 (e.g., on the gateway 504) for the device is launched by the plugin manager 517 on the gateway 504 and the plugin 502 discovers the device 508.

The plugin 502 performs protocol mapping to translate non-OCF properties to OCF resources which are created in the resource manager of the OCF server 518. The resource manager invokes the routing optimizer on the OCF server 518, which obtains a remote access policy (from a resource remote access policy database or service 520) for a requested resource. Obtaining the remote access policy may be performed through pre-configured policies or via a user.

The routing optimizer interfaces with the plugin manager 517 to obtain the required plugin information (plugin 502, configuration, policy, keys etc.). The plugin information may then be migrated or mirrored to the cloud 510. The routing optimizer may instantiate the resource in the OCF rendezvous service at the cloud 510, such as using a resource directory or other mechanism.

After the plugin 502 is migrated or mirrored to the cloud 510, the non-OCF device 508 may communicate with, respond to, or otherwise interact with an OCF device, for example as described in the discussion above related to FIG. 4.

Figure 6:
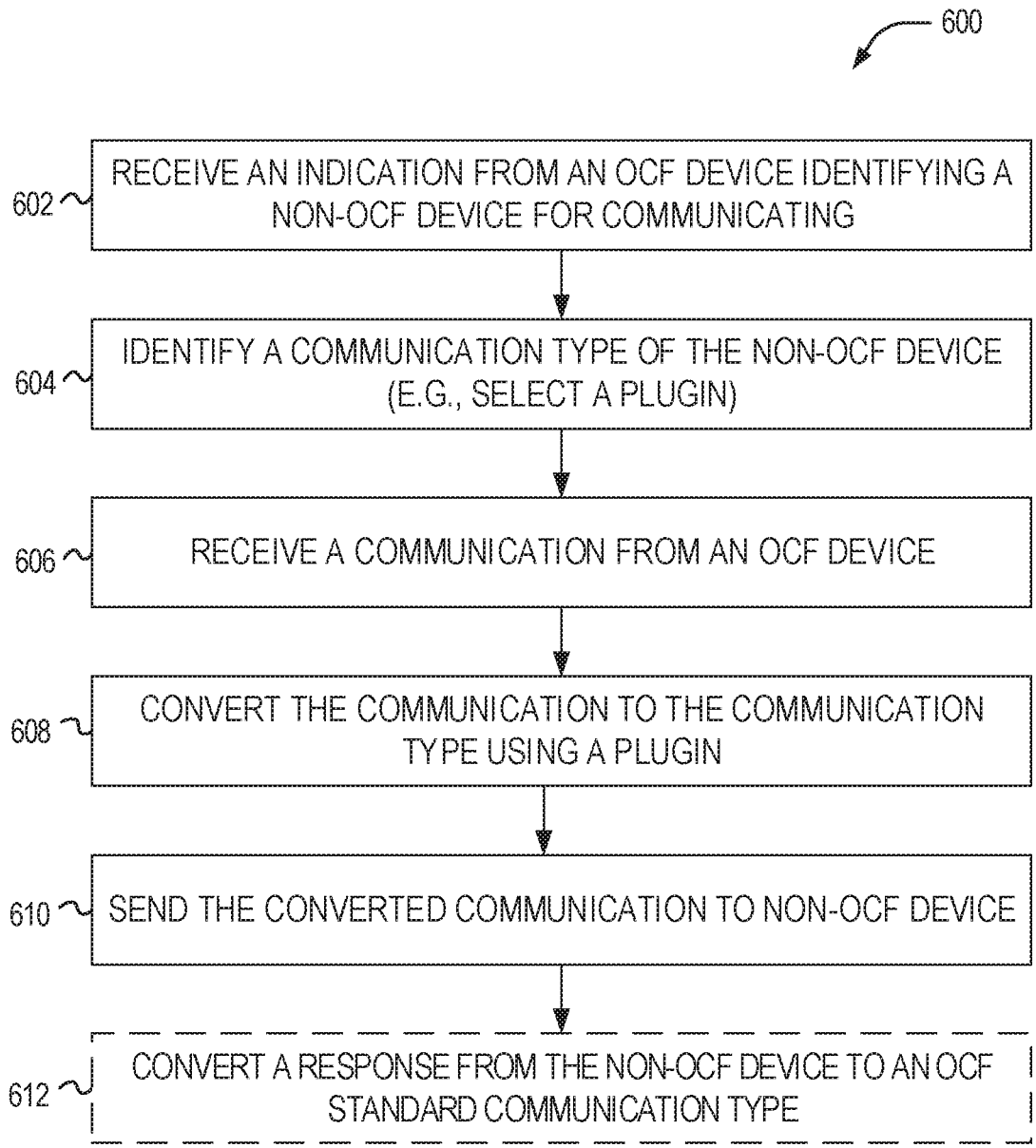
FIG. 6 illustrates a flowchart showing a technique for facilitating communication between an OCF device and a non-OCF device, according to an example.

FIG. 6 illustrates a flowchart showing a technique 600 for facilitating communication between an OCF device and a non-OCF device, according to an example.

The technique 600 includes an operation 602 to receive an indication from an OCF device identifying a non-OCF device for communicating.

The technique 600 includes an operation 604 to identify a network protocol of the non-OCF device (e.g., select a plugin), such as at a cloud service (e.g., using an OCF rendezvous service).

The technique 600 may include an operation to select a plugin according to the network protocol. The plugin may be mirrored on or migrated from the cloud service device from a local network that includes the non-OCF device.

The technique 600 includes an operation 606 to receive a communication from an OCF device (e.g., at the plugin of a cloud service). The communication may be sent using an OCF network protocol or a non-OCF network protocol.

The technique 600 includes an operation 608 to convert the communication to the network protocol using the plugin. The plugin may be mirrored or migrated to be stored on a cloud service (e.g., mirrored or migrated from an OCF gateway, such as from an OCF translation/plugin manager).

The technique 600 includes an operation 610 to send the converted communication to non-OCF device (e.g., using an IoT service of a cloud service). The communication may be sent to a router of an OCF system, which may send the communication to a non-OCF network bridge. The non-OCF network bridge may communicate with the non-OCF device. In an example, the non-OCF device may be onboarded before the converted communication is sent to the non-OCF device.

The technique 600 concludes with an optional operation 612 to convert a response from the non-OCF device to an OCF standard network protocol.

The technique 600 may include an operation to route the converted communication to an IoT service from the plugin. The IoT service may send the converted communication to a router or a non-OCF network bridge on a shared network with the non-OCF device. The router or the bridge may send the converted communication to the OCF device.

The technique 600 may include an operation to receive a response to the converted communication from the non-OCF device via a non-OCF network bridge, a router, or an IoT service (e.g., in the cloud). The plugin may be used to convert the response from the network protocol to an OCF network protocol. The converted response may be send to the OCF device.

The technique 600 may include an operation to perform a protocol mapping, using the plugin, to translate non-OCF properties to OCF resources. For example, plugin information related to the network protocol may be sent to a routing optimizer.

In other examples, the operations and functionality described above with reference to FIGS. 3 to 6 may be embodied by an IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a computer) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 7:
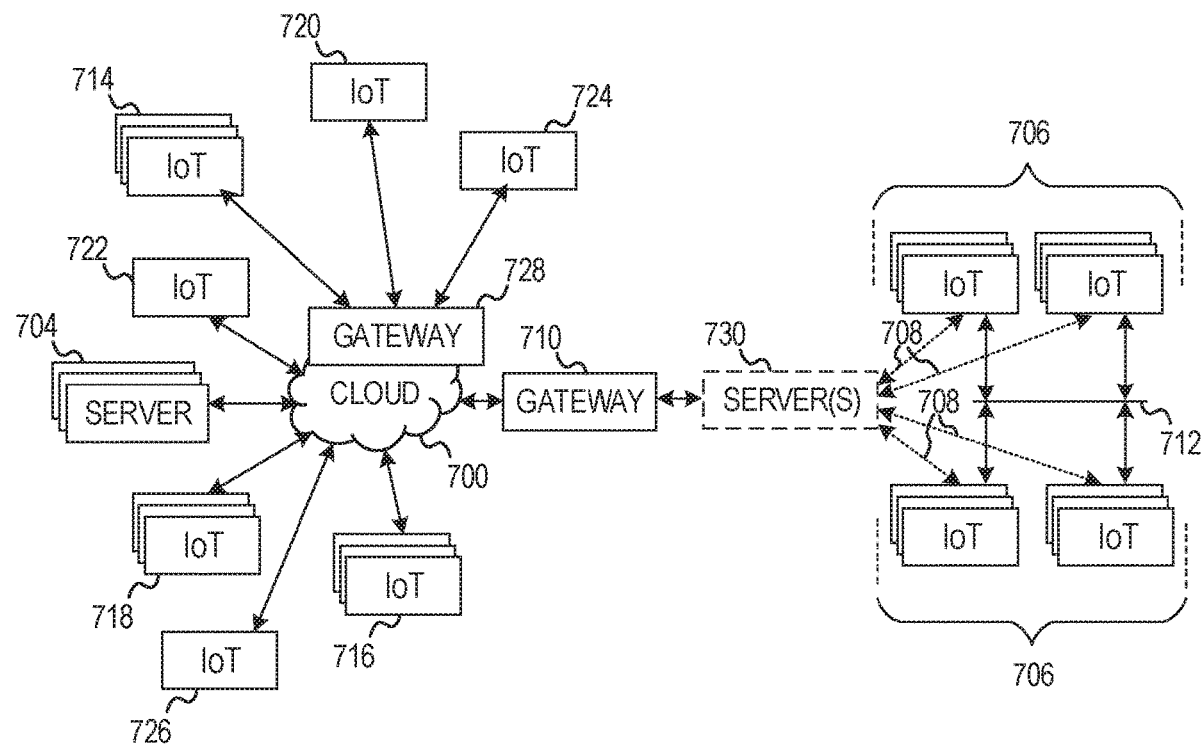
FIG. 7 illustrates a block diagram of a network illustrating communications among a number of IoT devices, according to an example.

FIG. 7 illustrates a drawing of a cloud computing network, or cloud 700, in communication with a number of Internet of Things (IoT) devices. The cloud 700 may represent the Internet, or may be a local area network (LAN), or a wide area network (WAN), such as a proprietary network for a company. The IoT devices may include any number of different types of devices, grouped in various combinations. For example, a traffic control group 706 may include IoT devices along streets in a city. These IoT devices may include stoplights, traffic flow monitors, cameras, weather sensors, and the like. The traffic control group 706, or other subgroups, may be in communication with the cloud 700 through wired or wireless links 708, such as LPWA links, optical links, and the like. Further, a wired or wireless sub-network 712 may allow the IoT devices to communicate with each other, such as through a local area network, a wireless local area network, and the like. The IoT devices may use another device, such as a gateway 710 or 728 to communicate with remote locations such as the cloud 700; the IoT devices may also use one or more servers 730 to facilitate communication with the cloud 700 or with the gateway 710. For example, the one or more servers 730 may operate as an intermediate network node to support a local edge cloud or fog implementation among a local area network. Further, the gateway 728 that is depicted may operate in a cloud-to-gateway-to-many edge devices configuration, such as with the various IoT devices 714, 720, 724 being constrained or dynamic to an assignment and use of resources in the cloud 700.

Other example groups of IoT devices may include remote weather stations 714, local information terminals 716, alarm systems 718, automated teller machines 720, alarm panels 722, or moving vehicles, such as emergency vehicles 724 or other vehicles 726, among many others. Each of these IoT devices may be in communication with other IoT devices, with servers 704, with another IoT fog platform or system (not shown, but depicted in FIG. 2), or a combination therein. The groups of IoT devices may be deployed in various residential, commercial, and industrial settings (including in both private or public environments).

As may be seen from FIG. 7, a large number of IoT devices may be communicating through the cloud 700. This may allow different IoT devices to request or provide information to other devices autonomously. For example, a group of IoT devices (e.g., the traffic control group 706) may request a current weather forecast from a group of remote weather stations 714, which may provide the forecast without human intervention. Further, an emergency vehicle 724 may be alerted by an automated teller machine 720 that a burglary is in progress. As the emergency vehicle 724 proceeds towards the automated teller machine 720, it may access the traffic control group 706 to request clearance to the location, for example, by lights turning red to block cross traffic at an intersection in sufficient time for the emergency vehicle 724 to have unimpeded access to the intersection.

Clusters of IoT devices, such as the remote weather stations 714 or the traffic control group 706, may be equipped to communicate with other IoT devices as well as with the cloud 700. This may allow the IoT devices to form an ad-hoc network between the devices, allowing them to function as a single device, which may be termed a fog platform or system (e.g., as described above with reference to FIG. 2).

Figure 8:
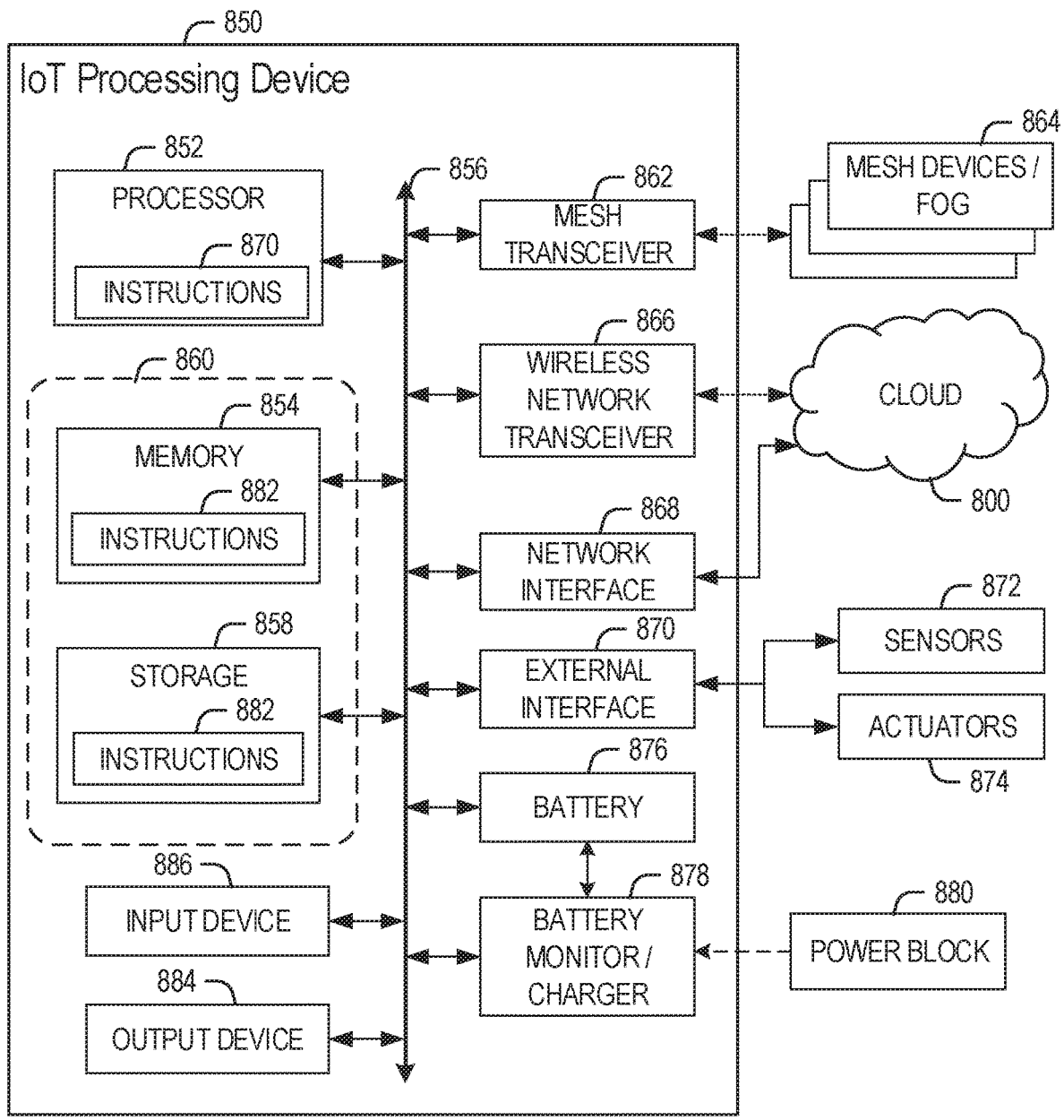
FIG. 8 illustrates a block diagram for an example IoT processing system architecture upon which any one or more of the techniques (e.g., operations, processes, methods, and methodologies) discussed herein may be performed, according to an example.

FIG. 8 is a block diagram of an example of components that may be present in an IoT device 850 for implementing the techniques described herein. The IoT device 850 may include any combinations of the components shown in the example or referenced in the disclosure above. The components may be implemented as ICs, portions thereof, discrete electronic devices, or other modules, logic, hardware, software, firmware, or a combination thereof adapted in the IoT device 850, or as components otherwise incorporated within a chassis of a larger system. Additionally, the block diagram of FIG. 8 is intended to depict a high-level view of components of the IoT device 850. However, some of the components shown may be omitted, additional components may be present, and different arrangement of the components shown may occur in other implementations.

The IoT device 850 may include processing circuitry in the form of a processor 852, which may be a microprocessor, a multi-core processor, a multithreaded processor, an ultra-low voltage processor, an embedded processor, or other known processing elements. The processor 852 may be a part of a system on a chip (SoC) in which the processor 852 and other components are formed into a single integrated circuit, or a single package, such as the Edison™ or Galileo™ SoC boards from Intel. As an example, the processor 852 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A7 processor from Apple® Inc., a Snapdragon™ processor from Qualcomm® Technologies, Inc., or an OMAP™ processor from Texas Instruments, Inc.

The processor 852 may communicate with a system memory 854 over an interconnect 856 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDiMiVis.

To provide for persistent storage of information such as data, applications, operating systems and so forth, a storage 858 may also couple to the processor 852 via the interconnect 856. In an example the storage 858 may be implemented via a solid state disk drive (SSDD). Other devices that may be used for the storage 858 include flash memory cards, such as SD cards, microSD cards, xD picture cards, and the like, and USB flash drives. In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in a SoC based system. Other bus systems may be included, such as an I2C interface, an SPI interface, point to point interfaces, and a power bus, among others.

The interconnect 856 may couple the processor 852 to a mesh transceiver 862, for communications with other mesh devices 864. The mesh transceiver 862 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 864. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 862 may communicate using multiple standards or radios for communications at different range. For example, the IoT device 850 may communicate with close devices, e.g., within about 10 meters, using a local transceiver based on BLE, or another low power radio, to save power. More distant mesh devices 864, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 866 may be included to communicate with devices or services in the cloud 800 via local or wide area network protocols. The wireless network transceiver 866 may be a LPWA transceiver that follows the IEEE 802.15.4, or IEEE 802.15.4g standards, among others. The IoT device 850 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 862 and wireless network transceiver 866, as described herein. For example, the radio transceivers 862 and 866 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 862 and 866 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 866, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 868 may be included to provide a wired communication to the cloud 800 or to other devices, such as the mesh devices 864. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to allow connect to a second network, for example, a NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 862, 866, 868, or 870. Accordingly, in various examples, applicable means for communicating (e.g., receiving, transmitting, etc.) may be embodied by such communications circuitry.

The interconnect 856 may couple the processor 852 to an external interface 870 that is used to connect external devices or subsystems. The external devices may include sensors 872, such as accelerometers, level sensors, flow sensors, optical light sensors, camera sensors, temperature sensors, a global positioning system (GPS) sensors, pressure sensors, barometric pressure sensors, and the like. The external interface 870 further may be used to connect the IoT device 850 to actuators 874, such as power switches, valve actuators, an audible sound generator, a visual warning device, and the like.

In some optional examples, various input/output (I/O) devices may be present within, or connected to, the IoT device 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 850.

A battery 876 may power the IoT device 850, although in examples in which the IoT device 850 is mounted in a fixed location, it may have a power supply coupled to an electrical grid. The battery 876 may be a lithium ion battery, or a metal-air battery, such as a zinc-air battery, an aluminum-air battery, a lithium-air battery, and the like.

A battery monitor/charger 878 may be included in the IoT device 850 to track the state of charge (SoCh) of the battery 876. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 878 may communicate the information on the battery 876 to the processor 852 over the interconnect 856. The battery monitor/charger 878 may also include an analog-to-digital (ADC) convertor that allows the processor 852 to directly monitor the voltage of the battery 876 or the current flow from the battery 876. The battery parameters may be used to determine actions that the IoT device 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the IoT device 850. A wireless battery charging circuit, such as an LTC4020 chip from Linear Technologies of Milpitas, Calif., among others, may be included in the battery monitor/charger 878. The specific charging circuits chosen depend on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine readable medium 860 including code to direct the processor 852 to perform electronic operations in the IoT device 850. The processor 852 may access the non-transitory, machine readable medium 860 over the interconnect 856. For instance, the non-transitory, machine readable medium 860 may be embodied by devices described for the storage 858 of FIG. 8 or may include specific storage units such as optical disks, flash drives, or any number of other hardware devices. The non-transitory, machine readable medium 860 may include instructions to direct the processor 852 to perform a specific sequence or flow of actions, for example, as described with respect to the flowchart(s) and block diagram(s) of operations and functionality depicted above.

In still a specific example, the instructions 888 on the processor 852 (separately, or in combination with the instructions 888 of the machine readable medium 860) may configure execution or operation of a trusted execution environment (TEE) 890. In an example, the TEE 890 operates as a protected area accessible to the processor 852 for secure execution of instructions and secure access to data. Various implementations of the TEE 890, and an accompanying secure area in the processor 852 or the memory 854 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 850 through the TEE 890 and the processor 852.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Figure 9:
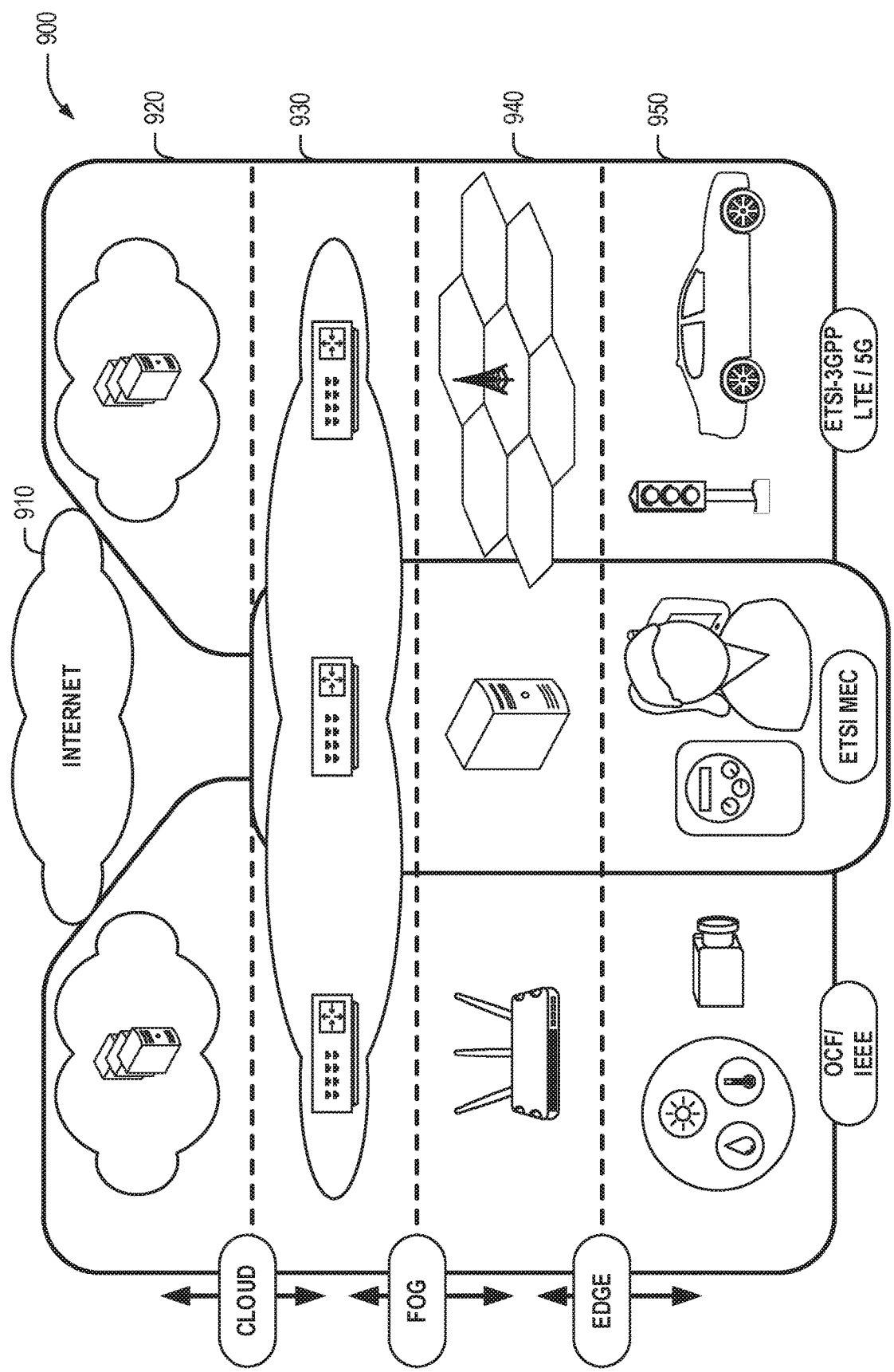
FIG. 9 illustrates a system of networked components, according to an example.

FIG. 9 illustrates a system 900 of networked components in various IoT and infrastructure settings, according to an example. The system 900 may include devices, services, or networks configured to communicate using OCF/IEEE communications standards (e.g., as defined above), ETSI Mobile Edge Computing or Multi-access Edge Computing (MEC) communications standards, or ETSI-3GPP (e.g., LTE, 5G) communications standards. The networked components of system 900 communicate across different levels of network topologies, such as the Internet 910, cloud devices 920, routing devices 930, station/access point/server connection devices 940, and end devices 950.

As further examples of the concepts discussed in FIGS. 1, 2, 7, and 8, above, the various layers and networked components may be generally categorized as cloud (Internet 910, cloud devices 920), fog (routing devices 930, station/access point/server connection devices 940), and edge devices (station/access point/server connection devices 940, end devices 950), although any of the networked components may be set up to operate in any of the layers. A fog network may represent a dense geographical distribution of near-user edge devices (e.g., fog nodes), equipped with storage capabilities (e.g., to avoid the need to store data in cloud data centers), communication capabilities (e.g., rather than routed over the Internet backbone), control capabilities, configuration capabilities, measurement and management capabilities (rather than controlled primarily by network gateways such as those in the LTE core network), among others.

The end devices 950 may include IoT devices or hosts, including vehicles, mobile devices, sensors, or the like. The station/access point/server connection devices 940 may include a wireless access point (e.g., for Wi-Fi), a server or other connection device (which may include a mobile device, such as a phone or a tablet), or a station (e.g., a base station or Node B, such as an enhanced Node B (eNB), according to 3GPP specifications). The routing devices 930 may include a switch, a server, a router, or the like, which may be physical or virtual. The cloud devices 920 may be servers or other devices. The internet 910 may represent other devices or servers not within the system 900.

MEC may encompass an architecture that enable cloud computing functionality or information technology (IT) services at network (e.g., cellular network) edges. MEC may reduce network congestion by moving applications, data, discovery, etc. closer to the user (e.g., mobile device, user equipment (UE), station (STA), etc.). Some MEC details dealing with security (e.g., both user security as well as application integrity), radio use, etc., have been promulgated by ETSI, such as in the "Mobile Edge Computing Introductory Technical White Paper," published Sep. 1, 2014.

In MEC implementations of the system 900, a device (e.g., a server) may be used as a mobile edge host, such as a localized server (e.g., a street server, embedded in a traffic signal device or system, etc.). Another device in the system 900 may be used as an end device (e.g., a mobile device such as a phone, a laptop, a tablet, an IoT device, a vehicle, etc.). The end device may communicate with the localized server to offload computationally intensive applications or actions such as graphical rendering (e.g., high-speed browsing artificial reality or virtual reality, 3D gaming applications, video processing etc.), intermediate data-processing (e.g., sensor data cleansing, video analysis, etc.), or value-added services (e.g., translation, log analytics, etc.).

An end device may initiate a MEC service for a specific application or action, which may be started on an appropriate MEC host (e.g., the localized server). The application may have a set of requirements (e.g. latency, compute resources, storage resources, location, network capability, security condition etc.) that are fulfilled by the MEC host (e.g., server). The system 900 may select a host fulfilling the requirements (e.g., by using the station/access point/server connection devices 940).

The MEC implementation of system 900 may be used to improve application and service mobility and service continuation among multiple edge computing hosts and groups (such as for automobiles, or user movement within and in/outside of service areas). Application and service customization at the MEC host for network operator-trusted mobile edge applications (e.g., for targeted advertising, enterprise services, group-based content, subscriber content) may be implemented using the system 900.

MEC offers application developers and content providers cloud-computing capabilities and an IT service environment at the edge of the network. This environment offers ultra-low latency and high bandwidth throughput as well as real-time access to radio network information that may be leveraged by applications. MEC technology permits flexible and rapid deployments of innovative applications and services towards mobile subscribers, enterprises, or vertical segments. It will be apparent that the use of devices, services, applications, and resources in this fashion will implicate many aspects of access control and management. Accordingly, dynamic access policy provisioning techniques discussed above with reference to FIGS. 3 to 6 may be performed or coordinated in a MEC implementation. Further, the preceding techniques, although described with reference to OCF examples, may also be equally implemented in a variety of other IoT standards implementations.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a cloud service device comprising: an Open Connectivity Foundation (OCF) routing service to: receive an indication from an OCF device identifying a non-OCF device for communicating; and identify a network protocol of the non-OCF device; and a processor to execute a plugin selected according to the network protocol, the plugin to: receive a communication from the OCF device; convert the communication to the network protocol; and send the converted communication to the non-OCF device.

In Example 2, the subject matter of Example 1 includes, wherein the communication is received according to an OCF network specification.

In Example 3, the subject matter of Examples 1-2 includes, wherein the network protocol is a network protocol established according to a network specification other than an OCF network specification.

In Example 4, the subject matter of Examples 1-3 includes, wherein the processor is further to route the converted communication to an IoT service, the IoT service to send the converted communication to a router connected to the non-OCF device via a non-OCF network bridge on a shared network with the non-OCF device.

In Example 5, the subject matter of Example 4 includes, wherein the processor is further to: receive a response to the converted communication from the non-OCF device via the non-OCF network bridge, the router, and the IoT service; convert the response from the network protocol to an OCF network specification; and send the converted response to the OCF device.

In Example 6, the subject matter of Examples 1-5 includes, wherein the plugin is mirrored on the cloud service device from a local network including the non-OCF device.

In Example 7, the subject matter of Examples 1-6 includes, wherein the processor is further to onboard the non-OCF device before the converted communication is sent to the non-OCF device.

In Example 8, the subject matter of Examples 1-7 includes, wherein the processor is further to perform a protocol mapping to translate non-OCF properties to OCF resources.

In Example 9, the subject matter of Example 8 includes, wherein the processor is further to send plugin information related to the network protocol to a routing optimizer to obtain a remote access policy related to the non-OCF device.

In Example 10, the subject matter of Examples 1-9 includes, wherein the network protocol of the non-OCF device includes an wherein the network protocol of the non-OCF device includes an OMA Lightweight M2M (LWM2M) protocol, a protocol according to a onem2m specification, a OPC Unified Architecture protocol, or a protocol according to an Open Process Automation Forum (OPAF) specification.

Example 11 is at least one non-transitory machine-readable medium including instructions for interconnecting Open Connectivity Foundation (OCF) and non-OCF communication devices, which when executed by a processor, cause the processor to perform operations to: receive an indication from an OCF device identifying a non-OCF device for communicating; identify a network protocol of the non-OCF device; select a plugin according to the network protocol; receive a communication from the OCF device; convert, using the plugin, the communication to the network protocol; and send the converted communication to the non-OCF device.

In Example 12, the subject matter of Example 11 includes, wherein the communication is received according to an OCF network specification.

In Example 13, the subject matter of Examples 11-12 includes, wherein the network protocol is a network protocol established according to a network specification other than an OCF network specification.

In Example 14, the subject matter of Examples 11-13 includes, wherein the instructions further cause the processor to route the converted communication to an IoT service from the plugin, the IoT service to send the converted communication to a router connected to the non-OCF device via a non-OCF network bridge on a shared network with the non-OCF device.

In Example 15, the subject matter of Example 14 includes, wherein the instructions further cause the processor to: receive a response to the converted communication from the non-OCF device via the non-OCF network bridge, the router, and the IoT service; convert, using the plugin, the response from the network protocol to an OCF network protocol; and send the converted response to the OCF device.

In Example 16, the subject matter of Examples 11-15 includes, wherein the plugin is mirrored on the cloud service device from a local network including the non-OCF device.

In Example 17, the subject matter of Examples 11-16 includes, wherein the instructions further cause the processor to onboard the non-OCF device before the converted communication is sent to the non-OCF device.

In Example 18, the subject matter of Examples 11-17 includes, wherein the instructions further cause the processor to perform a protocol mapping, using the plugin, to translate non-OCF properties to OCF resources.

In Example 19, the subject matter of Example 18 includes, wherein the instructions further cause the processor to send plugin information related to the network protocol to a routing optimizer to obtain a remote access policy related to the non-OCF device.

Example 20 is a method for interconnecting Open Connectivity Foundation (OCF) and non-OCF communication devices, the method comprising: receiving an indication from an OCF device identifying a non-OCF device for communicating; identifying a network protocol of the non-OCF device; selecting a plugin according to the network protocol; receiving a communication from the OCF device; converting, using the plugin, the communication to the network protocol; and sending the converted communication to the non-OCF device.

In Example 21, the subject matter of Example 20 includes, wherein the communication is received according to an OCF network specification.

In Example 22, the subject matter of Examples 20-21 includes, wherein the network protocol is a network protocol established according to a network specification other than an OCF network specification.

In Example 23, the subject matter of Examples 20-22 includes, routing the converted communication to an IoT service from the plugin, wherein the IoT service is to send the converted communication to a router connected to the non-OCF device via a non-OCF network bridge on a shared network with the non-OCF device.

In Example 24, the subject matter of Example 23 includes, receiving a response to the converted communication from the non-OCF device via the non-OCF network bridge, the router, and the IoT service; converting, using the plugin, the response from the network protocol to an OCF network protocol; and sending the converted response to the OCF device.

In Example 25, the subject matter of Examples 20-24 includes, wherein the plugin is mirrored on the cloud service device from a local network including the non-OCF device.

In Example 26, the subject matter of Examples 20-25 includes, onboarding the non-OCF device before the converted communication is sent to the non-OCF device.

In Example 27, the subject matter of Examples 20-26 includes, performing a protocol mapping, using the plugin, to translate non-OCF properties to OCF resources.

In Example 28, the subject matter of Example 27 includes, sending plugin information related to the network protocol to a routing optimizer to obtain a remote access policy related to the non-OCF device.

Example 29 is an apparatus for interconnecting Open Connectivity Foundation (OCF) and non-OCF communication devices, the apparatus comprising: means for receiving an indication from an OCF device identifying a non-OCF device for communicating; means for identifying a network protocol of the non-OCF device; means for selecting a plugin according to the network protocol; means for receiving a communication from the OCF device; means for converting, using the plugin, the communication to the network protocol; and means for sending the converted communication to the non-OCF device. In a specific example, the means for receiving and transmitting may be implemented by the device 850 through the examples of processing circuitry and communications circuitry as discussed above.

In Example 30, the subject matter of Example 29 includes, means for routing the converted communication to an IoT service from the plugin, wherein the IoT service is to send the converted communication to a router connected to the non-OCF device via a non-OCF network bridge on a shared network with the non-OCF device. In a specific example, the means for receiving and transmitting may be implemented by the device 850 through the examples of processing circuitry and communications circuitry as discussed above.

In Example 31, the subject matter of Example 30 includes, means for receiving a response to the converted communication from the non-OCF device via the non-OCF network bridge, the router, and the IoT service; means for converting, using the plugin, the response from the network protocol to an OCF network protocol; and means for sending the converted response to the OCF device. In a specific example, the means for receiving and transmitting may be implemented by the device 850 through the examples of processing circuitry and communications circuitry as discussed above.

In Example 32, the subject matter of Examples 29-31 includes, means for onboarding the non-OCF device before the converted communication is sent to the non-OCF device. In a specific example, the means for receiving and transmitting may be implemented by the device 850 through the examples of processing circuitry and communications circuitry as discussed above.

In Example 33, the subject matter of Examples 29-32 includes, means for performing a protocol mapping, using the plugin, to translate non-OCF properties to OCF resources. In a specific example, the means for receiving and transmitting may be implemented by the device 850 through the examples of processing circuitry and communications circuitry as discussed above.

In Example 34, the subject matter of Example 33 includes, means for sending plugin information related to the network protocol to a routing optimizer to obtain a remote access policy related to the non-OCF device. In a specific example, the means for receiving and transmitting may be implemented by the device 850 through the examples of processing circuitry and communications circuitry as discussed above.

In Example 35, the subject matter of Examples 29-34 includes, wherein the communication is sent using an OCF communication type.

In Example 36, the subject matter of Examples 29-35 includes, wherein the communication type is a non-OCF communication type.

In Example 37, the subject matter of Examples 29-36 includes, wherein the plugin is mirrored on the cloud service device from a local network including the non-OCF device.

Example 38 is at least one machine-readable medium including instructions that, when executed by processing circuitry, cause the processing circuitry to perform operations to implement of any of Examples 29-37.

Example 39 is an apparatus comprising means to implement of any of Examples 28-36.

Example 40 is a system to implement of any of Examples 29-37.

Example 41 is a method to implement of any of Examples 29-37.

Example 42 is a device fog adapted to perform the operations of any of Examples 1 to 37.

Example 43 is a device owner transfer service system adapted to perform the operations of onboarding invoked by any of Examples 1 to 37.

Example 44 is an Open Connectivity Foundation (OCF) device, configured as a server, client, or intermediary according to an OCF specification, comprising means to implement the operations of any of Examples 1 to 37.

Example 45 is an Internet of Things (IoT) network topology, the IoT network topology comprising respective communication links adapted to perform communications for the operations of any of Examples 1 to 37.

Example 46 is a network comprising respective devices and device communication mediums for performing any of the operations of Examples 1 to 37.

Example 47 is an apparatus comprising means for performing any of the operations of Examples 1 to 37.

Example 48 is a system to perform the operations of any of Examples 1 to 37.

The operations and functionality described above in these examples, and in the embodiments described with reference to FIGS. 3 to 6, may apply in a variety of network settings such as IoT networking, edge networking, fog networking, cloud networking, and all hybrids thereof. The operations and functionality of these examples and configurations may occur in a distributed fashion, including in distributed networked settings where one aspect of the functionality is performed by a first IoT edge device or edge network, another aspect of the functionality is performed by a fog network or platform, and yet another aspect of the functionality is performed by a cloud device or system. Further combinations which follow these shared, distributed, or grouping principles, as suggested in the examples and configurations above, can be employed. Accordingly, it will be evident that the functionality described herein may be operable to work within many permutations of the examples and configurations above, and like variations.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A cloud service device comprising:
processing circuitry configured to operate a cloud-based routing service to:
receive an indication from a first device connected to a network operating a first network protocol;
identify a second device operating a second network protocol for communicating when the second device is not connected to the network to which the first device is connected; and
identify the second network protocol of the second device;
a processor to execute a plugin selected according to the second network protocol, the plugin controlled by the cloud-based routing service to, at the cloud-based routing service:
receive a communication from the first device;
convert the communication to the second network protocol; and
onboard the second device to the cloud-based routing service, wherein to onboard the second device includes:
registration of the second device with the cloud-based routing service,
authentication of the second device with the cloud-based routing service;
mapping of a resource of the first device to the second device with the cloud-based routing service;
sending the converted communication to the second device from the cloud-based routing service, wherein the converted communication is not sent to the second device until the second device is registered and authenticated, and the resource of the second device is mapped;
causing the second device to join the network to which the first device is connected; and
onboarding the second device to the network to which the first device is connected.

2. The cloud service device of claim 1, wherein the communication is received according to a specification of the first network protocol.

3. The cloud service device of claim 1, wherein the second network protocol is a network protocol established according to a network specification other than a network specification of the first network protocol.

4. The cloud service device of claim 1, wherein the processor is further to route the converted communication to an IoT service, the IoT service to send the converted communication to a router connected to the second device via a network bridge on a shared network with the second device.

5. The cloud service device of claim 4, wherein the processor is further to:
receive a response to the converted communication from the second device via the network bridge, the router, and the IoT service;
convert the response from the second network protocol to the first network protocol; and
send the converted response to the first device.

6. The cloud service device of claim 1, wherein the plugin is mirrored on the cloud service device from a local network including the second device.

7. The cloud service device of claim 1, wherein the processor is further to perform a protocol mapping to translate properties of the second network protocol to resources of the first network protocol.

8. The cloud service device of claim 7, wherein the processor is further to send plugin information related to the second network protocol to a routing optimizer to obtain a remote access policy related to the second device.

9. The cloud service device of claim 1, wherein the network protocol of the second device includes an OMA Lightweight M2M (LWM2M) protocol, a protocol according to a onem2m specification, a OPC Unified Architecture protocol, or a protocol according to an Open Process Automation Forum (OPAF) specification.

10. At least one non-transitory machine-readable medium including instructions for interconnecting devices operating different network protocols, which when executed by a processor, cause the processor to perform operations to:
receive an indication from a first device connected to a network operating a first network protocol;
identify a second device for communicating when the second device is not connected to the network to which the first device is connected;
identify a second network protocol of the second device;
select a plugin according to the second network protocol;
execute the plugin according to the second network protocol, the plugin controlled by a cloud-based routing service to, at the cloud based routing service:
receive a communication from the first device;
convert, using the plugin, the communication to the second network protocol; and
onboard the second device to the cloud-based routing service, wherein to onboard the second device includes:
registration of the second device with the cloud-based routing service, authentication of the second device with the cloud-based routing service, and mapping of a resource of the first device to the second device with the cloud- based routing service;

cause the cloud-based routing service to send the converted communication to the second device from the cloud-based routing service, wherein the converted communication is not sent to the second device until the second device is registered and authenticated, and the resource of the second device is mapped;

causing the second device to join the network to which the first device is connected; and onboarding the second device to the network to which the first device is connected.

11. The at least one machine-readable medium of claim 10, wherein the communication is received according to a specification of the first network protocol.

12. The at least one machine-readable medium of claim 10, wherein the second network protocol is a network protocol established according to a network specification other than a network specification of the first network protocol.

13. The at least one machine-readable medium of claim 10, wherein the instructions further cause the processor to route the converted communication to an IoT service from the plugin, the IoT service to send the converted communication to a router connected to the second device via a network bridge on a shared network with the second device.

14. The at least one machine-readable medium of claim 13, wherein the instructions further cause the processor to:
receive a response to the converted communication from the second device via the network bridge, the router, and the IoT service;
convert, using the plugin, the response from the second network protocol to the first network protocol; and
send the converted response to the first device.

15. The at least one machine-readable medium of claim 10, wherein the plugin is mirrored on a cloud service device from a local network including the second device.

16. The at least one machine-readable medium of claim 10, wherein the instructions further cause the processor to perform a protocol mapping, using the plugin, to translate properties of the second network protocol to resources of the first network protocol.

17. The at least one machine-readable medium of claim 16, wherein the instructions further cause the processor to send plugin information related to the second network protocol to a routing optimizer to obtain a remote access policy related to the second device.

18. A method for interconnecting devices operating different network protocols, the method comprising:
receiving an indication from a first device connected to a network operating a first network protocol;
identifying a second device for communicating when the second device is not connected to the network to which the first device is connected;
identifying a second network protocol of the second device;
selecting a plugin according to the second network protocol;
executing the plugin according to the second network protocol, the plugin controlled by a cloud-based routing service to perform operations at the cloud based routing service, the operations including:
receiving a communication from the first device;
converting, using the plugin, the communication to the second network protocol;
onboarding the second device to the cloud-based routing service, wherein onboarding the second device includes:
registering of the second device with the cloud-based routing service,
authenticating of the second device with the cloud-based routing service, and
mapping of a resource of the first device to the second device; and
sending the converted communication to the second device from the cloud-based routing service, wherein the converted communication is not sent to the second device until the second device is registered and authenticated, and the resource of the second device mapped;
causing the second device to join the network to which the first device is connected; and
onboarding the second device to the network to which the first device is connected.

19. The method of claim 18, further comprising routing the converted communication to an IoT service from the plugin, wherein the IoT service is to send the converted communication to a router connected to the second device via a network bridge on a shared network with the second device.

20. The method of claim 19, further comprising:
receiving a response to the converted communication from the second device via the network bridge, the router, and the IoT service;
converting, using the plugin, the response from the second network protocol to the network protocol; and
sending the converted response to the first device.

21. The method of claim 18, further comprising performing a protocol mapping, using the plugin, to translate properties of the second network protocol to resources of the first network protocol.

22. The method of claim 21, further comprising sending plugin information related to the second network protocol to a routing optimizer to obtain a remote access policy related to the second device.

* * * * *

UNITED STATES PATENT AND TRADEMARK OFFICE
CERTIFICATE OF CORRECTION

PATENT NO. : 11,483,418 B2
APPLICATION NO. : 16/110011
DATED : October 25, 2022
INVENTOR(S) : Agerstam et al.

Page 1 of 1

It is certified that error appears in the above-identified patent and that said Letters Patent is hereby corrected as shown below:

On the Title Page

On page 2, in Column 1, under "U.S. Patent Documents", Line 1, delete "2017/0000582" and insert --2017/0005820-- therefor Signed and Sealed this
Eighth Day of August, 2023

Katherine Kelly Vidal
*Director of the United States Patent and Trademark Office*